M. W. MIX.
LAMINATED MOTOR CAR FRAME.
APPLICATION FILED JAN. 31, 1916.
1,265,939.
Patented May 14, 1918.
2 SHEETS—SHEET 1.
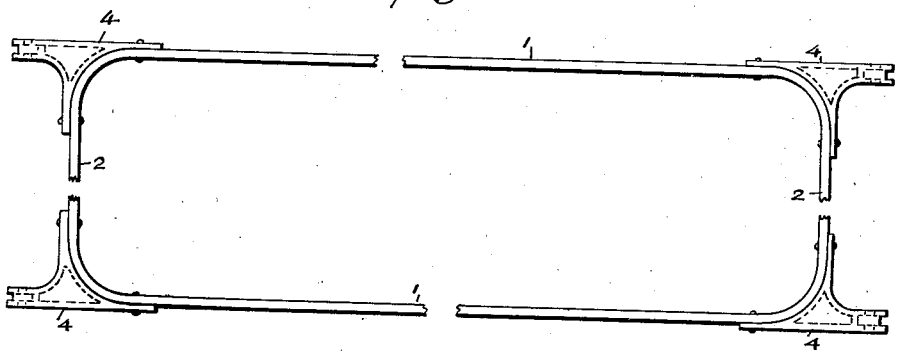
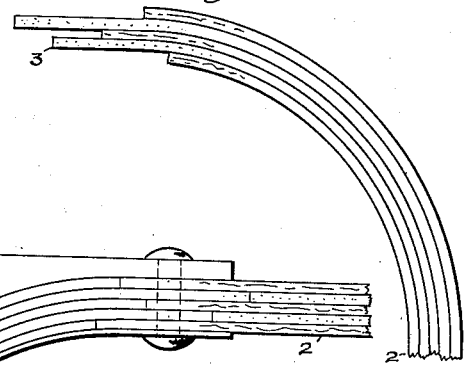
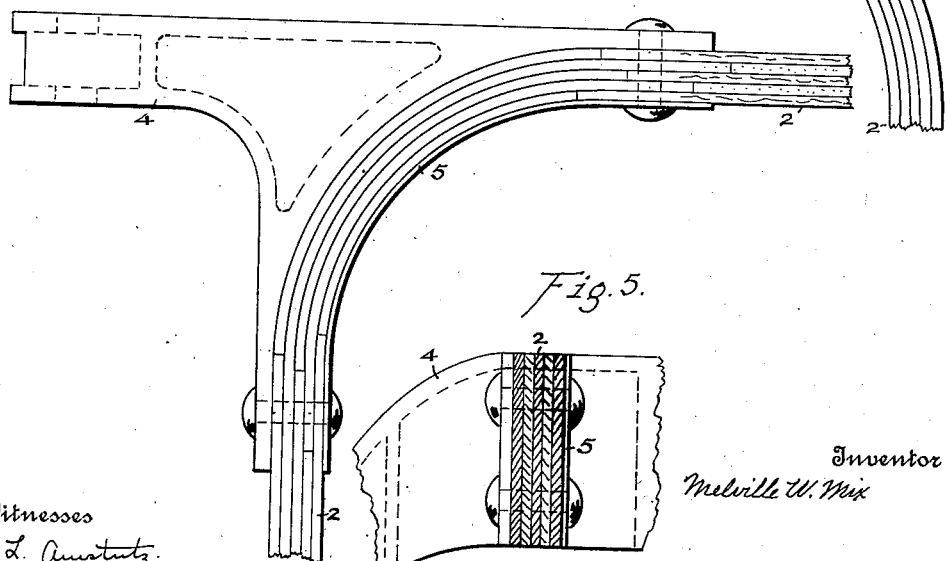
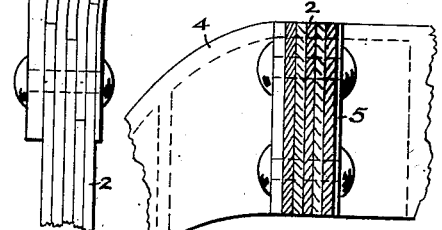
Witnesses
A. L. Amstutz
M. G. Campbell
Inventor
Melville W. Mix
By N. S. Amstutz
Attorney

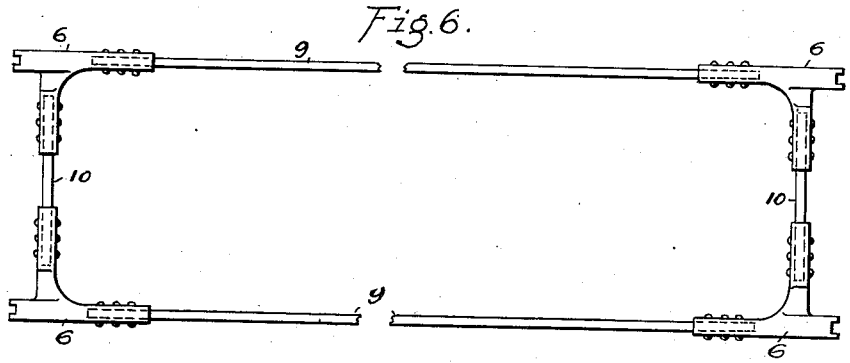
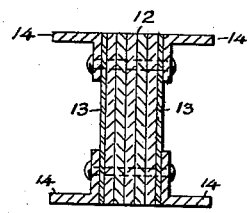
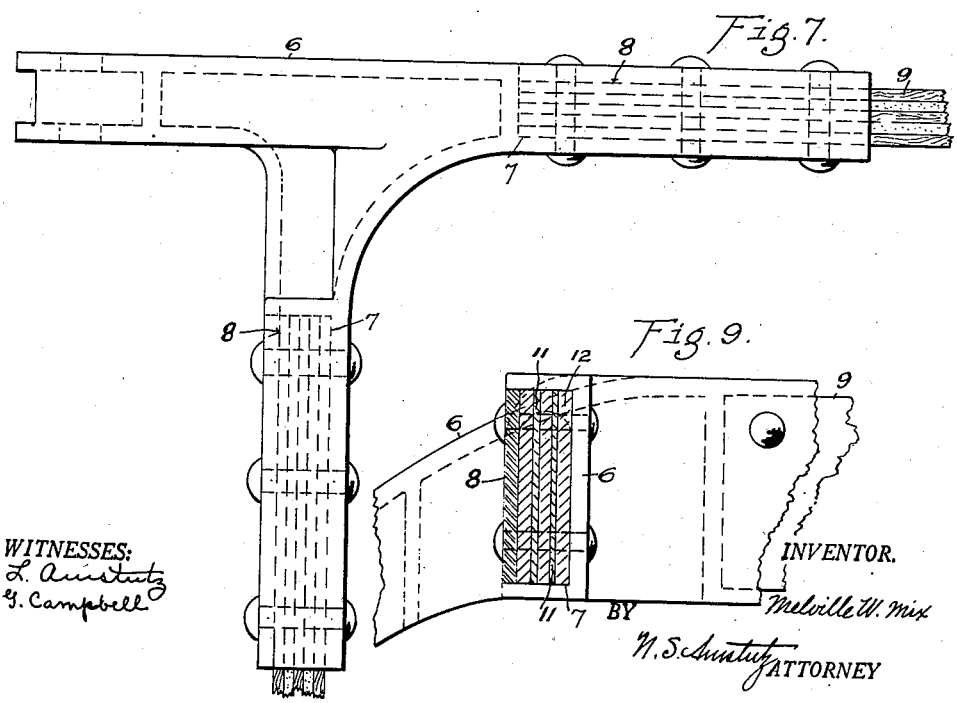

UNITED STATES PATENT OFFICE.

MELVILLE W. MIX, OF MISHAWAKA, INDIANA, ASSIGNOR TO DODGE MANUFACTURING COMPANY, OF MISHAWAKA, INDIANA, A CORPORATION OF INDIANA.

LAMINATED MOTOR-CAR FRAME.

1,265,939. Specification of Letters Patent. Patented May 14, 1918.

Application filed January 31, 1916. Serial No. 75,352.

*To all whom it may concern:*

Be it known that MELVILLE W. MIX, a citizen of the United States, residing at Mishawaka, in the county of St. Joseph and State of Indiana, has invented certain new and useful Improvements in Laminated Motor-Car Frames, of which the following is a specification.

My invention relates to improvements in laminated motor car or analogous frames and it consists more especially of the features pointed out in the annexed claims.

The purpose of my invention is to provide a light weight frame or chassis that will have the greatest possible resiliency and toughness to withstand all the shocks to which such frames are subjected; to avoid all the weaknesses of welded metal frames or those specially forged; to provide a chassis that will be more elastic than those usually used, thus insuring a longer life for the mechanism that may be supported thereby and also afford greater comfort to the persons using such means of transportation; to also provide a chassis that shall save the wheels of the car with their tires from needless shocks reacting through the ordinary metal to metal structures.

With these and other ends in view I illustrate in the accompanying drawings such an instance of adaptation as will disclose the broad features without limiting myself to the specific details shown.

Figure 1— is a diagrammatic view showing a continuous reversible chassis.

Fig. 2— is an enlarged view of a built-up side of the chassis ready to be joined to the corner section shown in Fig. 3.

Fig. 3— is a laminated corner section ready to be joined to a side and end portion.

Fig. 4— is a plan view of a form of corner bracket which enables one to attach the chassis to whatever under or super structure is desired.

Fig. 5— is a vertical section through a portion of the frame showing layers disposed vertically.

Fig. 6— is a view similar to Fig. 1 instancing a discontinuous reversible chassis.

Fig. 7— is an enlarged view of a corner section.

Fig. 8— is a cross section of a reinforced laminated frame member.

Fig. 9— is a cross section of a frame member having variable thickness laminæ.

In the present practice of building motor car frames of steel, or its special alloys that are rolled or pressed into such cross sections as will give the greatest strength it is found difficult to handle large pieces, to make strong joints when cross members are used, to form the ends for the "side rails" in substantially a single piece, etc. In light chassis for motor delivery cars a steel frame of sufficient strength for the duty required becomes unwieldy and unduly heavy and not as elastic as is desirable.

As a substitute for such inefficient structures the laminated chassis instanced herein is made of built-up layers of wood veneer with the grain of one layer at a different angle to that of the layers adjacent thereto. By building up the layers in this way a continuous one-piece frame is produced in which the sides 1 are joined to the ends 2 with long overlapping layers as 3. Alternate plies project from the side and end pieces. These projections may be as long as desired. Ends 2 are made with curved corners. Should it be found desirable the corners may be formed separately and held in a mold while subjected to pressure and heat, thus the size of chassis could be readily altered by using various lengths for the side and end sections.

When the size of the chassis has been determined suitable sides, corner and ends having their layers disposed vertically as shown in Fig. 5 are spread with glue at their joining ends, pushed together, and subjected to heat while under great pressure, thus making a one-piece structure which is very strong, light in proportion to its strength and yet very elastic.

Corner brackets 4 may be pressed out of thin metal. They are fastened in any suitable manner to the laminated frame 1, and they ordinarily serve to form suspensions for the outer ends of the supporting springs. The wood frame may be impregnated or coated in any desired manner to withstand prolonged attacks of moisture, etc., without deteriorating its physical characteristics.

It will be seen that chassis constructed in the manner instanced or its practical equivalent are simple to make, store and assemble. They are economical in cost of production and demand little or no mechanism to place them into actual use as a component part of motor car frames. It is of course understood that I do not limit myself to the specific use of laminated frames for this purpose, neither do I limit myself to the use of laminations of wood as any other material may be used which has a "grain" regardless whether it is a natural or artificial product.

As a substitute for the continuous frame instanced in Fig. 1 a discontinuous structure shown diagrammatically in Fig. 6 may be used if desired. In this type of frame the sides 9 and ends 10 are made separate. They are seated in channels 7 of corner brackets or sections 6 where they are held under cover plates 8 by means of rivets or any other suitable fastening.

The laminated sides 1 and 9; ends 2 and 10 may be formed of a combination of thin plies 11 and thick plies 12, and to protect them on one or both faces against damage from accidental impact with sharp objects thin metal plates 13 may be used. Should a reinforcing be required for specially heavy service or otherwise, angles 14 may be secured so as to make a composite I beam in cross section of wood and metal components.

To reinforce and additionally support the corner bends of continuous frames, thin metal plates 5 may be attached to the inner face of the laminations by suitably riveting the same to corner brackets 4. It will be seen that the corner brackets 6 may also be formed of thin metal, as stampings, or they may be produced as castings or in any other manner desired.

What I claim is,

1. A laminated vehicle frame, comprising longitudinal and transverse members constituting sides and ends formed of a plurality of plies suitably cemented in interlaced relation and set perpendicular to the general plane of the frame, metallic corner pieces secured to the sides and ends of the frame, and projections extending parallel to the frame from the corner pieces adapted to have springs, etc., attached thereto, the corner pieces being so assembled on the frame that the projections will be approximately parallel to each other in the plane of the frame.

2. A laminated vehicle frame, comprising sides and ends formed of a plurality of plies cemented to each other in interlaced relation with the plies perpendicular to the plane of the frame, and metallic corner members secured to the sides and ends to reinforce the same and provided with supporting projections extending substantially parallel to one of the lineal dimensions of the frame adapted to be attached to springs, etc., as desired.

3. A laminated vehicle frame, of rectangular shape with rounded corners, comprising suitably joined sides formed of a plurality of plies placed edgewise and cemented together in interlaced relation, metallic corner reinforcements secured to the frame on two sides, and projections from the reinforcements extending outward from the frame parallel thereto and adapted to receive springs, etc.

4. An article of manufacture comprising a composite vehicle frame composed of longitudinal and transverse portions having a plurality of laminated plies cemented together and assembled in edgewise relation, metallic reinforcements secured to the plies, and means projecting from the reinforcements parallel with the frame adapted to be attached to springs, etc.

5. A composite vehicle frame, comprising both sides and ends formed of a plurality of plies cemented together in interlaced relation, independent metallic corner pieces fastened both to the ends and sides, and projections from such corner pieces extending outward therefrom in a plane substantially parallel to the frame.

In testimony whereof I affix my signature in presence of two witnesses.

MELVILLE W. MIX.

Witnesses:
CHAS. ENDLICH,
ARTHUR W. ZIMMERMAN.